(12) United States Patent
Wilson et al.

(10) Patent No.: US 10,380,204 B1
(45) Date of Patent: Aug. 13, 2019

(54) VISUAL SEARCH

(71) Applicant: Pinterest, Inc., San Francisco, CA (US)

(72) Inventors: Jason Luke Wilson, Mill Valley, CA (US); Naveen Gavini, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 809 days.

(21) Appl. No.: 14/618,789

(22) Filed: Feb. 10, 2015

Related U.S. Application Data

(60) Provisional application No. 61/939,175, filed on Feb. 12, 2014.

(51) Int. Cl.
*G06F 17/30* (2006.01)
*G06F 16/9535* (2019.01)

(52) U.S. Cl.
CPC .............................. *G06F 16/9535* (2019.01)

(58) Field of Classification Search
CPC ......... G06F 17/30867; G06F 17/30693; G06F 17/30646; G06F 17/30864; G06F 16/9535; G06F 16/3349
See application file for complete search history.

(56) References Cited

U.S. PATENT DOCUMENTS

| | | | |
|---|---|---|---|
| 6,523,026 B1* | 2/2003 | Gillis | G06F 16/3332 |
| 2002/0038299 A1* | 3/2002 | Zernik | G06F 17/30017 |
| 2003/0161504 A1* | 8/2003 | Inoue | G06K 9/00221 |
| | | | 382/115 |
| 2008/0155426 A1* | 6/2008 | Robertson | G06F 17/30696 |
| | | | 715/738 |
| 2011/0055203 A1* | 3/2011 | Gutt | G06F 17/30274 |
| | | | 707/722 |
| 2013/0159306 A1* | 6/2013 | Janssen, Jr. | G06F 16/148 |
| | | | 707/737 |
| 2014/0156669 A1* | 6/2014 | Bati | G06F 8/443 |
| | | | 707/741 |
| 2014/0330857 A1* | 11/2014 | Hunter | G06F 17/30864 |
| | | | 707/767 |
| 2015/0106157 A1* | 4/2015 | Chang | G06Q 30/0201 |
| | | | 705/7.29 |
| 2015/0178302 A1* | 6/2015 | Plakhov | G06F 17/30864 |
| | | | 707/706 |

* cited by examiner

*Primary Examiner* — Noosha Arjomandi
(74) *Attorney, Agent, or Firm* — Athorus, PLLC

(57) ABSTRACT

Described is a system and method for enabling visual search for information. With each selection of a search term, additional search terms are dynamically selected and presented to the user in conjunction with results matching the currently selected search terms. Likewise, a selected search term may be tokenized and a graphical token presented to the user to represent the selected search term.

19 Claims, 15 Drawing Sheets though those skilled in the art will recognize that the implementations are not limited to the examples or drawings described. It should be understood that the drawings and detailed description thereto are not intended to limit imple-
VISUAL SEARCH

CROSS-REFERENCE TO RELATED APPLICATIONS

This application claims the benefit of U.S. provisional application No. 61/939,175, filed Feb. 12, 2014, entitled "VISUAL SEARCH," which is incorporated herein by reference in its entirety.

BACKGROUND

With the ever expanding amount of accessible digital content available to users and customers, it continues to become more and more difficult to discover the content for which the user is searching. Several different search techniques exist, such as keyword searching, but there are many inefficiencies in such systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
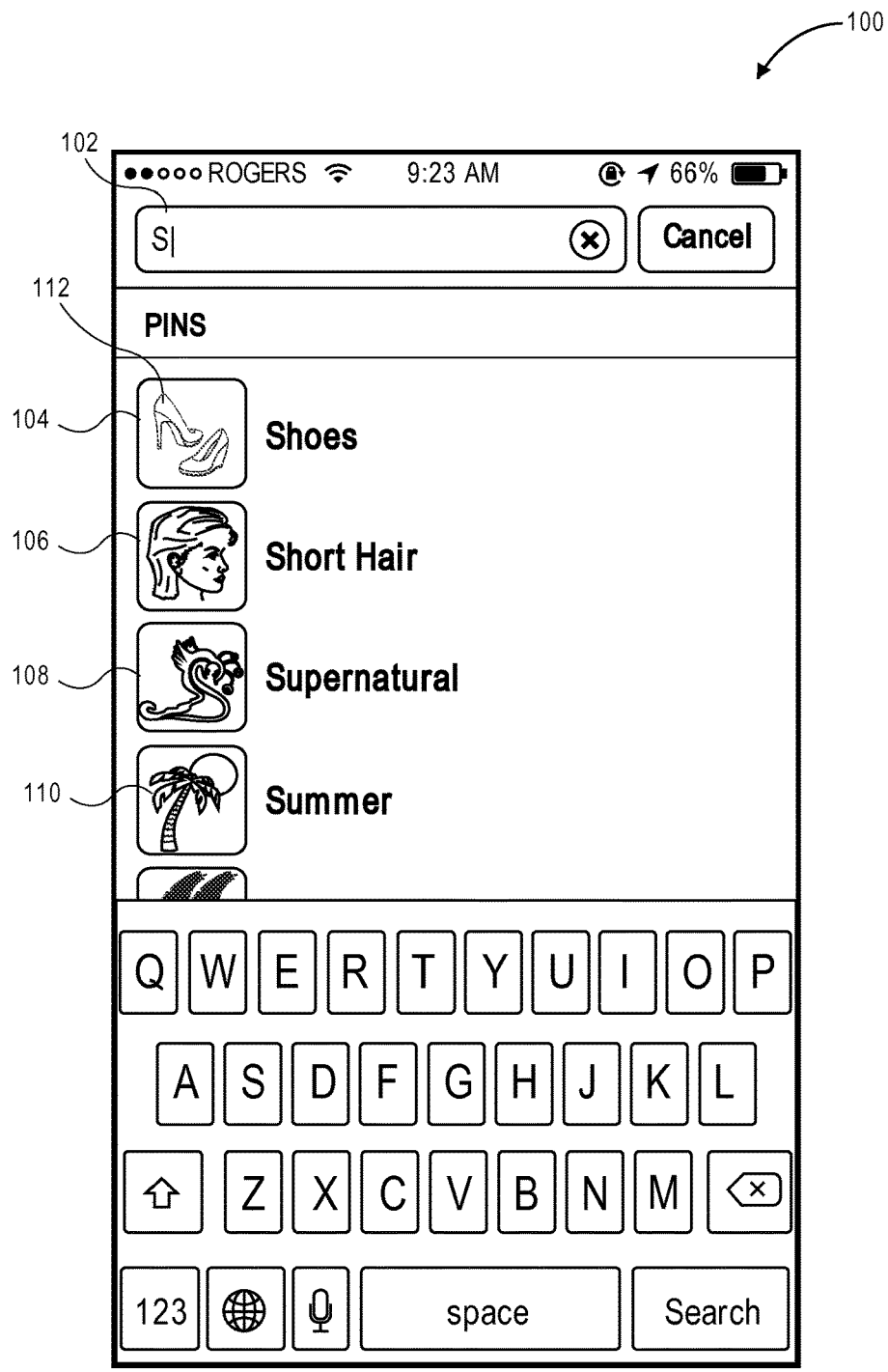
FIG. 1 is a representation of a graphical user interface for entering a search term, in one implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Described herein is a system and method that facilitates visual search for information. In one implementation, a user may begin a search by typing in a few characters of an initial search term. Based on the first few character entries, potential matching search terms are presented to the user for selection. A user may either select one of the presented initial search terms or continue typing in an initial search term. Upon selection of an initial search term, that selected term is tokenized and added to the search term bar. In some implementations, as discussed further below, the visual presentation of the tokenized search term may be presented in a color that corresponds with a color of the most frequent result that matches the initial search term.

Results matching the search term are also visually presented to the user for potential selection. Likewise, a set of secondary search terms are also presented in a visual form for potential selection by the user, according to an implementation. For example, secondary search terms that are most frequently paired with the selected initial search term may be visually presented to the user for potential selection. In some implementations, the visual presentation of each secondary search term may include the most frequent result matching the combination of the selected initial search term and the potential secondary search term.

Similar to the above, a user may either select a visually presented secondary search term or type in another secondary search term. Upon selection of a secondary search term, the selected secondary search term is tokenized and visually presented with the initially selected search term. In some implementations, the color of the visual presentation of the selected secondary search term may correspond to the color of the most frequent result matching the combination of the selected initial search term and the selected secondary search term. The secondary search term may be combined with the initial search term to reduce the set of matching results to only those that correspond with both the selected initial search term and the selected secondary search term.

With each selection of a search term, the selected search term is tokenized, added to the set of other selected search terms and the matching set of results are refined and presented to the user for potential selection. Likewise, additional search terms that may be added to the selected set of search terms may also be presented to the user for selection. In some implementations, it may be determined that the potential matching search terms presented to the user are to be characteristics of the matching results, rather than descriptive search terms. For example, as discussed below, if the user has selected the search terms "Shoes," "Brand A," "Running," rather than present additional descriptive search terms, the presented potential search terms may be characteristics of the results matching the selected set of search terms. In this example, a user may be presented with characteristic search terms, such as "Size," "Color," "Location." A user may select any one of the characteristic search terms to further refine the matching results.

In some implementations, a user may also be presented with alternatives to any one of the selected tokenized search terms and/or re-order the selected tokenized search terms. In some implementations, the alternatives may be alternative search terms that will still return matching results when used in combination with the other selected tokenized search terms. Continuing with the above example, if a user wanted to replace the search term "Brand A," rather than having to retype the entire set of search terms, the user may be presented with a list of alternatives to Brand A that will still return matching results when combined with the selected search terms of "Shoes" and "Running."

FIG. 1 is a representation of a graphical user interface 100 for entering an initial search term, in one implementation. As illustrated, a user may be presented with a search feature via a client device. A client device may include, for example, personal computers, tablet computers, eBook reader devices, laptop computers, desktop computers, netbooks, personal digital assistants (PDA), portable gaming devices, wireless communication devices, such as smart phones, wearable devices, or mobile handsets, set-top-boxes, game consoles, cameras, audio recorders/players, or any combination thereof.

Utilizing the client device, a user may enter one or more characters in a search term box 102. In this example, the user has entered the initial character "S" into the search term box 102. As each character is entered, a list 104 of potentially matching search terms is presented to the user for selection. Potentially matching search terms may be selected according to a variety of factors. In one implementation, potentially matching initial search terms may be determined based on the frequency with which those search terms are selected by other users of the system and/or based on the frequency of selection by the user entering the search term. Other factors, such as user history, location, popularity of terms, prior searches, etc., may also be considered when selecting potentially matching search terms.

In this example, the presented potentially matching search terms that begin with "S" are "Shoes" 104, "Short Hair" 106, "Supernatural" 108, "Summer" 110. In some implementations, the presented potentially matching terms may also include a visual representation of a corresponding result provided by that search term. For example, the search term "Shoes" is accompanied by a visual representation of a result 112 matching the search term "Shoes." The visual representation of the result 112 may be any result corresponding to the search term. In some implementations, the visual representation of the result 112 may be dynamically selected from matching results. For example, the visual representation of a result 112 may correspond with the most frequently viewed, rated, etc., result that corresponds with the search term. In another implementation, the visual representation of a result 112 may be determined and presented based on user specific factors. User specific factors may include past searches by the user, user preferences, other items identified as of interest to the user, etc. Regardless of the factors utilized to determine a visual representation of a result 112 to present, the visual representation of a result 112 may change over time as the popularity or other criteria for selecting the visual representation of the result changes.

A user may select a presented search term or continue typing an initial search term in the search box 102. In this example, the user selects the search term "Shoes."

Figure 2:
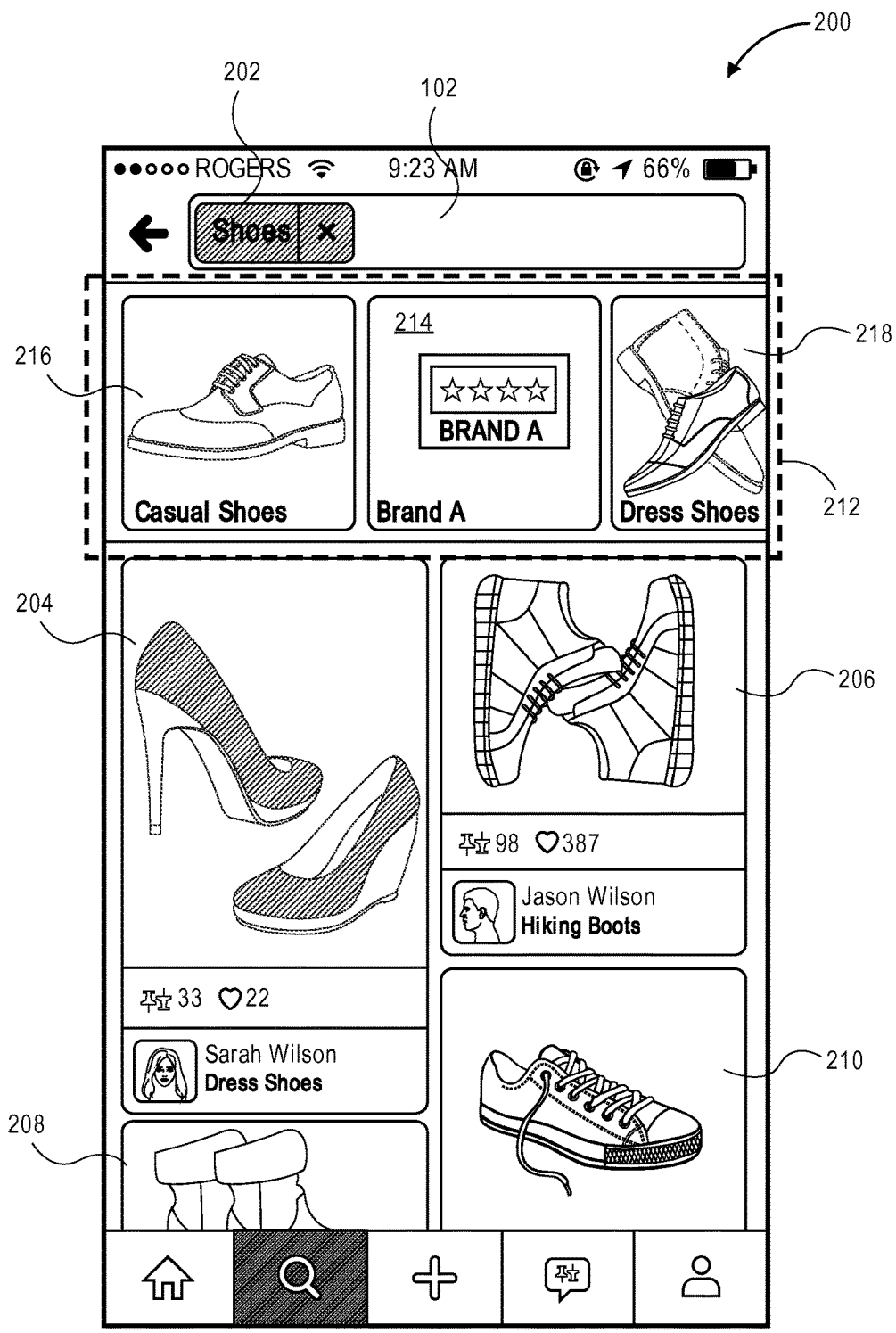
FIG. 2 is a representation of a graphical user interface illustrating results of a selected search term, in one implementation.

FIG. 2 is a representation of a graphical user interface 200 illustrating results of a selected search term, in this example "Shoes," in one implementation. Upon selection of an initial search term (e.g., "Shoes"), the search term is tokenized and visually presented as a token 202 in the search box 102. As discussed in more detail below with respect to FIG. 7, a user may remove and or change a tokenized search term. In some implementations, the tokenized search term may be associated with a color, shape, size, etc., that corresponds to results that match the search term. In this example, the visual representation of the token 202 is colored to correspond to the color of the most frequently matching result for the search term "Shoes." In this example, the most frequent matching result is a visual representation 204 of "Dress Shoes." The dress shoes presented in the visual representation 204 are maroon, represented by the angled lines in the visual representation 204 of the shoes and the token 202. In this example, to associate the token 202 with the matching results, the token 202 is presented in a maroon color to correspond with the color of the shoes included in the visual representation 204.

In addition to presenting the selected initial search term as a token 202, results that match the search term are also visually presented to the user. Results matching the search term may be selected according to a variety of factors. For example, results may be selected based on the rating of the results by other users, based on the frequency of selection, based on an age of the result, based on a user's profile, location, time of day, items identified as of interest to the user, language, etc. In this example, the user is visually presented with four results 204, 206, 208, 210 that correspond to the selected initial search term "Shoes." A user may scroll down and be presented with additional results that correspond with the search term "Shoes."

In some implementations, a search refinement bar 212 may also be presented to the user. The search refinement bar 212 includes additional search terms or filters that may be added to the selected initial search term to further refine the set of matching results. Rather than requiring a user to manually enter additional search terms or select from a static list of filters, the additional search terms presented in the search refinement bar 212 may be dynamically selected. The search terms presented in the search refinement bar may be based on, for example, the user preferences and/or search history, user demographics, popularity of the results corresponding to each additional search term when combined with the selected search term(s), location of the user, time of day, external event (e.g., news, advertisements) or other factors. Because the additional search terms are dynamically selected, the search terms presented to the user via the search refinement bar 212 may vary over time.

Search terms may be grouped into categories. For example, brands of shoes (e.g., Brand B, Brand A, Puma) may be a category of search terms. Categories may be defined as any type of like characteristic of terms.

In presenting additional search terms in the search refinement bar 212, in some implementations, the presentation of search terms may also depend on the categories of the search terms. As illustrated in FIG. 2, no representation of an additional search term is adjacent to another additional search term associated with the same category. For example, rather than presenting all the popular shoe brands (a category) adjacent to one another in the search refinement bar 212, additional search terms associated with other categories are also presented. For example, "Brand A" 214 is selected as an additional search term from the category of search terms for shoe brands and separates the search terms "Casual Shoes" 216 and "Dress Shoes" 218, both of which are from the category shoe type.

Figure 3:
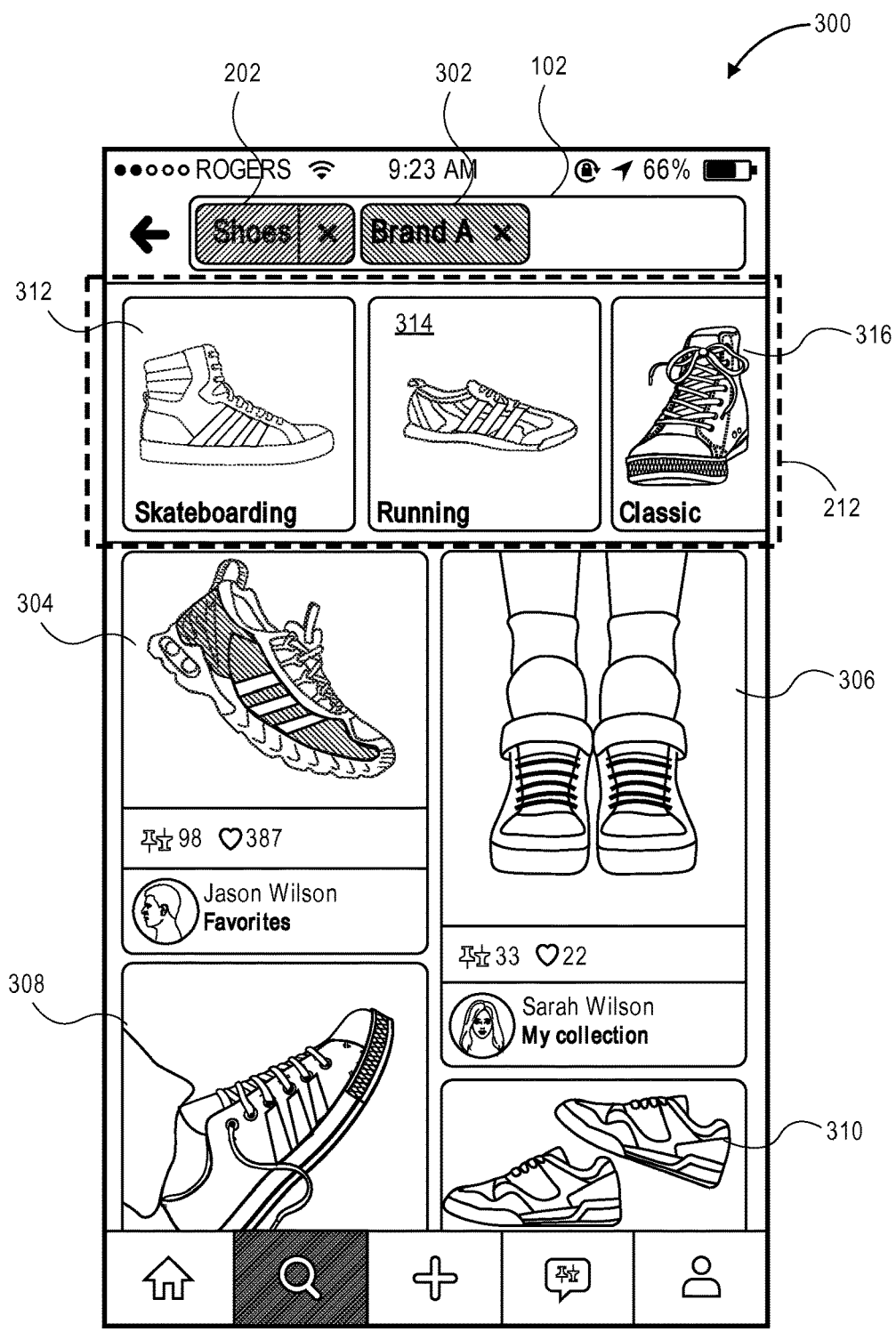
FIGS. 3-4 are representations of graphical user interfaces illustrating results of multiple selected search terms, in one implementation.

FIG. 3 is a representation of a graphical user interface 300 illustrating results of multiple selected search terms, in one implementation. FIG. 3 continues with the above example, and in this case the user has selected the additional search term "Brand A" 214 from the search refinement bar 212 of FIG. 2. Like the initial search term, the additional selected search term "Brand A" is tokenized and presented as a token 302 to the user. In comparison to the token 202 for the search term "Shoes," which is colored maroon to correspond with the color of the top matching search result for the search term "Shoes," the token 302 representative of the search term "Brand A" is colored orange to correspond with the color of the shoes in the top matching result for the combination of search terms "Shoes" and "Brand A," as illustrated by the angled lines in the visual representation 304 of the shoe and the token 302. In this example, the orange used to color the token 302 is generated to match the color of the shoe represented in the top matching search result 304.

In this example, with each search term that is added to the initial search term, the set of matching results is reduced to include only those results that correspond with all selected search terms. For example, in FIG. 3, each of the matching results 304, 306, 308, 310 correspond with both selected search terms "Shoes" and "Brand A." In other implementations, the search results may include results that match any of the selected search terms.

Similar to FIG. 2, the user interface 300 may also include a search refinement bar 212 that includes additional search terms that may be selected by the user to further reduce the set of matching search results. The additional search terms presented in the search refinement bar 212 may again be dynamically selected based on the selected search terms, user profile and/or preferences, popularity of results matching the combination of the selected search terms and potential search terms, etc. In this example, the additional search terms presented are descriptive terms that may be used to further refine the set of matching results. For example, based on the combination of the search terms "Shoes" and "Brand A" plus factoring in other criteria such as user profile, user preferences, user search history, user browse history, popularity of matching results, etc., the additional search terms of "Skateboarding" 312, "Running" 314, and "Classic" 316 are presented as additional search terms that may be selected by the user from the search refinement bar. The user may interact with the user interface to browse additional potential search terms, type in another search term in the search box 102, select a matching result 304-310, or browse additional matching results (not shown).

Figure 4:
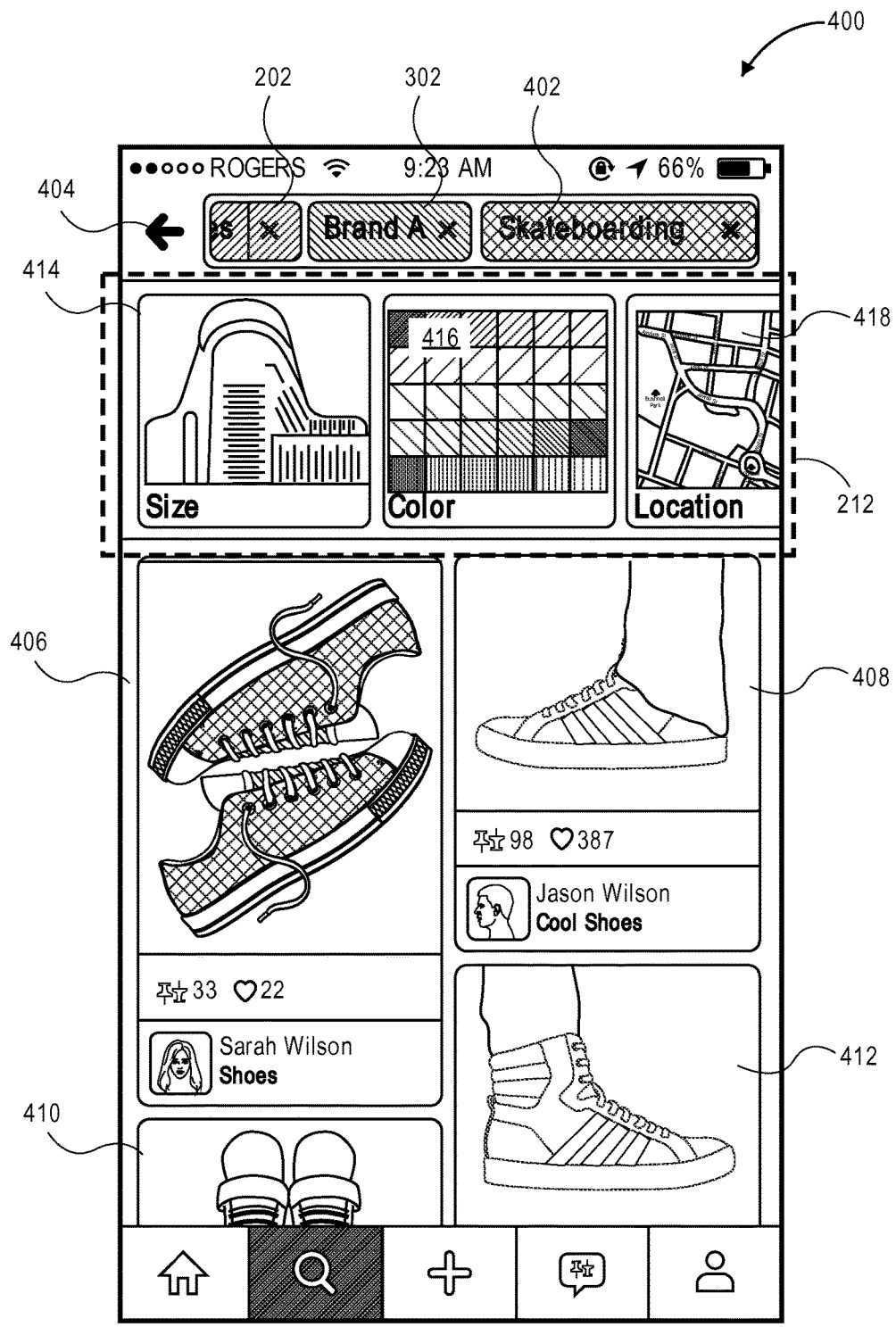

In this example, the user has selected another search term, "Skateboarding," as illustrated in FIG. 4. Specifically, FIG. 4 is a user interface showing search results from a selection of multiple search terms, in accordance with an implementation. As with each other selection of a search term, the search term is tokenized and presented to the user. Again, in some implementations, the color of the token may be produced to correspond with the color of the top matching result that corresponds with the combination of selected search terms. In this example, each of the tokens, 202, 302, 402 representative of the selected search terms is presented to the user in the search box. For presentation purposes, the tokens representative of the most recently selected search terms may be presented and the previously selected search terms may be truncated off the user interface. As illustrated in FIG. 4, the token 402, representative of the most recently selected search term "Skateboarding," is presented on the user interface 400 adjacent to the token 302. The token 202, representative of the selected initial search term, is partially truncated off of the user interface 400. A user may view additional tokens through interaction with user interface 400. For example the user may select and rearrange tokens thereby reordering the search terms. Likewise, a user may remove any one or more of the search terms by selecting the "X" represented on the token for the respective search term. Likewise, a user may eliminate all search terms and start a new search by selecting the back arrow 404.

As illustrated in FIG. 4, the matching results 406, 408, 410, 412 are presented to the user. Likewise, the search refinement box 212 includes additional search terms that may be selected by the user to further refine the matching results. In comparison to the user interface illustrated in FIGS. 2-3, the additional search terms are characteristics of the matching results that may be selected by the user, rather than descriptive terms. Characteristic search terms may be presented to the user when, for example, the matching results are of a quantity that the selected additional descriptive terms may reduce the set to a very small number. Alternatively, presenting characteristic search terms may be determined based on past search history of the user, based on search habits of the user or others, the number of search terms already selected, etc. For example, if a majority of searches that utilize some or all of the selected search terms further refine the matching results utilizing characteristic search terms, it may be determined that characteristic search terms are to be presented to the user via the search refinement box 212 for selection.

In the example illustrated in FIG. 4, the most frequent characteristics related to the matching results from the combination of search terms "Shoes," "Brand A," and "Skateboarding" are "Size" 414, "Color" 416, and "Location" 418. The user may interact with the search refinement bar to view other characteristic search terms.

Figure 5:
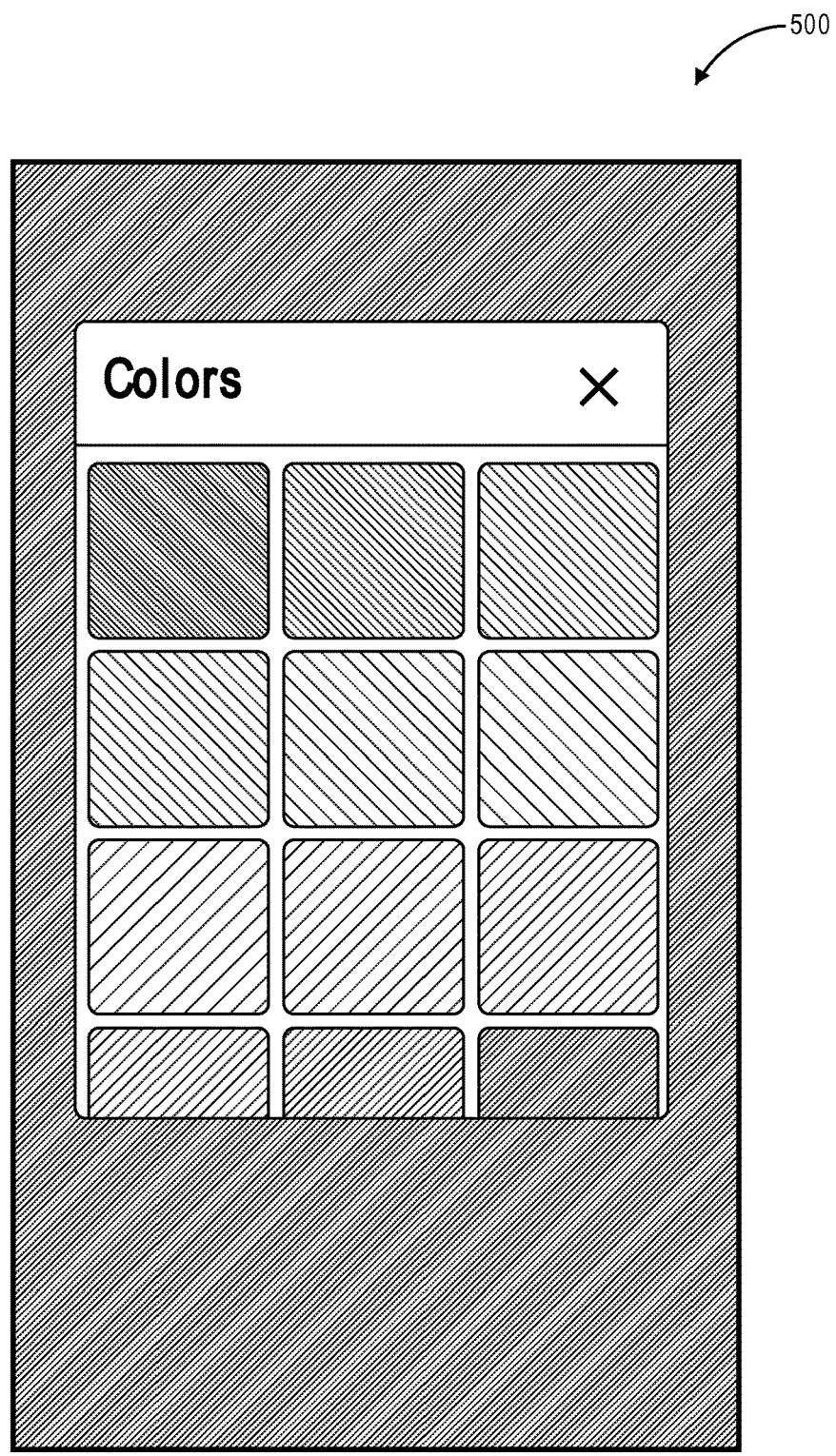
FIG. 5 is a representation of a graphical user interface illustrating additional search criteria, in one implementation.

Upon selection of a characteristic search term from the search refinement bar 212, the user may be presented with a user interface that allows the user to select the characteristics for use in further refining the matching results. For example, if the user selects the characteristic search term "Size" 414, the user may be presented with a user interface that allows selection of different shoe sizes (e.g., 4, 5, 6, 7, 8, 9, 10, 11, 12, 13). To further illustrate, the user interface 500 illustrated in FIG. 5 is presented to a user upon selection of the characteristic search term "Color" 416.

The user may select one or more of the matching characteristic options for use in further refining the matching results set. In comparison with the descriptive search terms in which only items corresponding to all of the selected search terms are presented, if the user selects multiple characteristics (e.g., black and orange) the result set may include matching results for either characteristic. The characteristic options may be obtained from the matching results, from an external source, or may be standard criteria (e.g., shoe size). In this example, the characteristic options are obtained from an external source (e.g., Brand A) and represent the different Brand A shoe colors.

Figure 6:
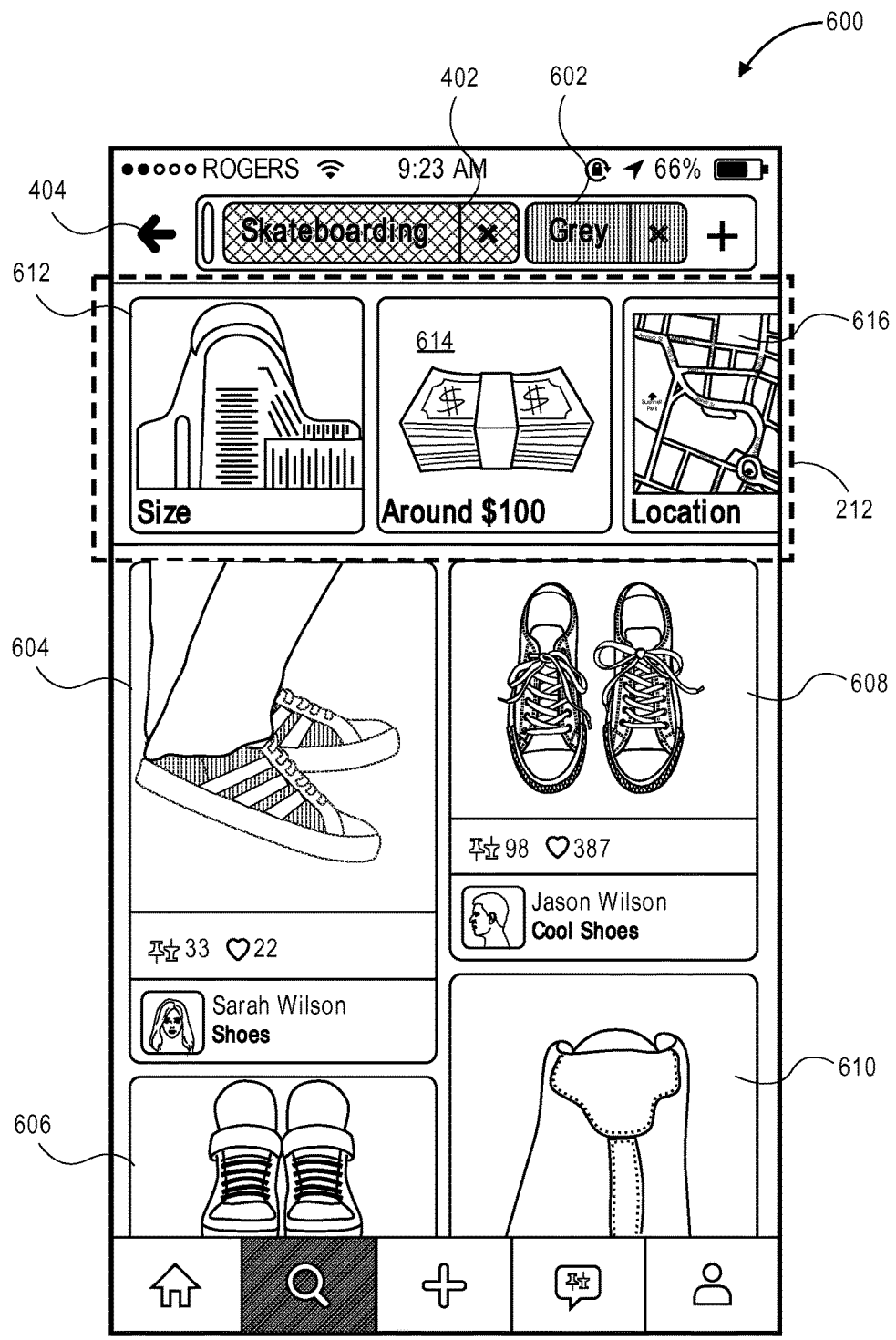
FIG. 6 is a representation of a graphical user interface illustrating results matching multiple search terms and selected criteria, in one implementation.

FIG. 6 is a representation of a graphical user interface 600 illustrating results matching multiple search terms and selected characteristic options, in one implementation. The results illustrated in FIG. 6 are based on the combination of selected descriptive search terms "Shoes," "Brand A," and "Skateboarding" and the characteristic option of the color "Grey," represented by the vertical lines in the visual presentation 604 of the shoes and the token 602. As illustrated, the user can view the most recent tokens 402, 602 representative of the selected search terms as well as the results 604, 606, 608, 610 that correspond with each of the selected search terms.

In this example, the search refinement bar 212 includes additional characteristic search terms, such as "Size" 612, "Price" 614 and "Location" 616 that may be selected by the user to further refine the matching results. In other implementations, the search refinement bar may be removed to provide additional display area for presentation of matching results.

Figure 7:
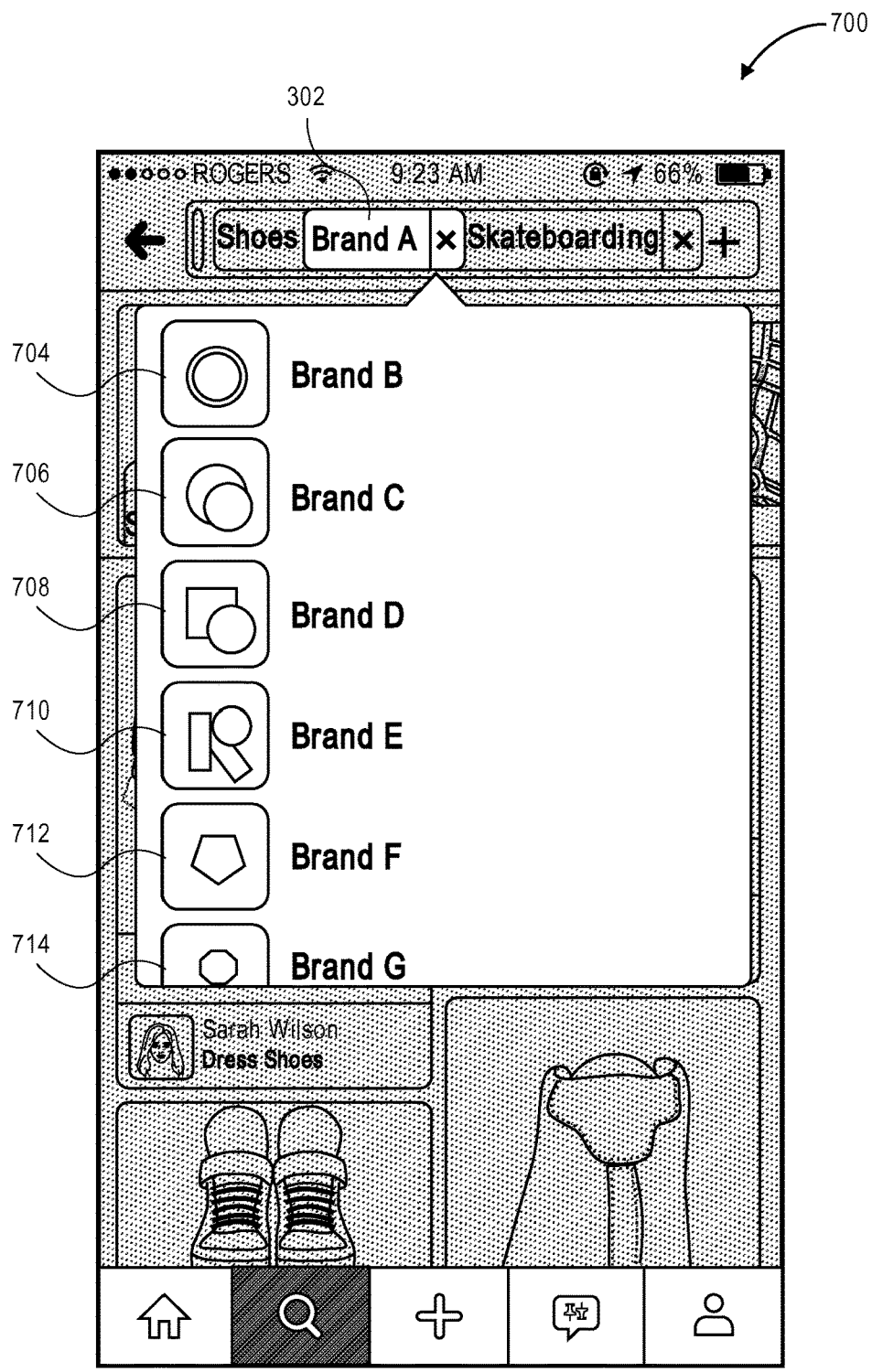
FIG. 7 is a representation of a graphical user interface illustrating alternative search terms, in one implementation.

FIG. 7 is a representation of a graphical user interface 700 illustrating alternative search terms corresponding to one of the previously selected search terms, in one implementation. As discussed above, a user may interact with the user interface to select search terms and/or matching results. When a search term is selected, it is tokenized and a token is presented that is representative of the search term. For example, FIG. 6 illustrates the tokens 302, 402, 602 selected by the user that are used to identify matching results.

A user may interact with the tokens to either remove a search term, by selecting the "X" on the token, rearrange the order of the search terms by moving the tokens, and/or replace a search term with alternative search terms of the same category. For example, referring to FIG. 6, the user can remove the search term "Grey" by selecting the "X" presented with the token 602. Likewise, the user can replace a search term by selecting the token. For example, referring again to FIG. 7, if the user selects the token 302 representative of the search term "Brand A," the user is presented with the user interface 700 that identifies alternative search terms of the same category as the search term represented by the selected token 302. In this example, the search term "Brand A" represented by the selected token 302 is part of a brand category.

The user interface 700 includes a dynamic list of other search terms included in the brand category. The dynamic list may only include search terms of that category that will include matching results when combined with the other search terms already selected by the user. Likewise, the dynamic list may be dynamically sorted according to one or more factors. For example, additional factors, such as popularity of the search terms, quantity of matching results, user preferences, user history, user profile, etc., may be considered in the generation of the order of search terms presented via the user interface.

In this example, the dynamic list presented in the user interface 700 includes "Brand B" 704, "Brand C" 706, "Brand D" 708, "Brand E" 710, "Brand F" 712 and "Brand G" 714. Additional alternative search terms may be viewed by interacting with the dynamic list presented on the user interface 700. In this example, each alternative search term is presented with the brand logo next to the term. In other implementations, a representation of the top or most frequently matching result for that search term when combined with the other search terms already selected by the user may be represented in the dynamic list. Because the popularity or other factors may continually change, the presentation that corresponds with the alternative search term may also change.

Figure 8:
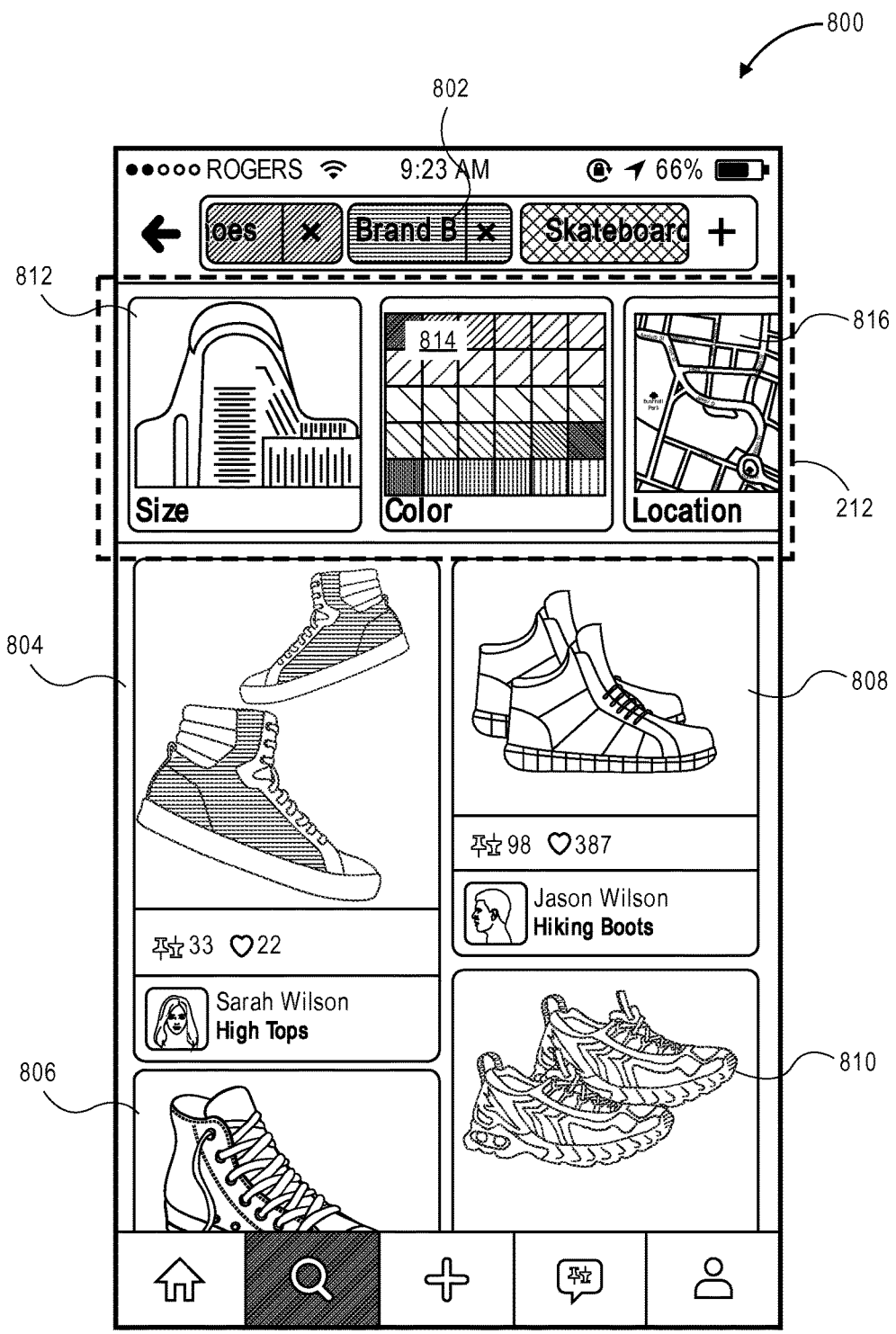
FIG. 8 is a representation of a graphical user interface illustrating results from multiple selected search terms, according to an implementation.

FIG. 8 is a representation of a graphical user interface 800 illustrating results from multiple selected search terms, according to an implementation. Continuing with the above example, the user has removed the search term "Grey" by selecting the "X" that was presented in the token 602 representative of the search term "Grey" and replaced the search term "Brand A" with the search term "Brand B."

When the user selected the search term "Brand B" from the dynamic list presented on the user interface 700, the search term "Brand A" is removed from the list of selected search terms and the search term "Brand B" is tokenized and added to the list of selected search terms. Likewise, the token 802 is presented to the user to represent the selected search term Brand B. As with the other tokens, the token 802 may be presented in a color that corresponds to the top results matching the combination of selected search terms.

The matching results 804, 806, 808, 810 are likewise updated to include results that correspond with each of the selected search terms, in this example, "Shoes," "Brand B," and "Skateboarding." Likewise, the additional search terms 812, 814, 816 presented in the search refinement bar 212 are dynamically updated based on the current search terms. A user may continue to interact with the tokens, selecting different alternative search terms, adding additional search terms, removing selected search terms, and browsing through matching results.

Figure 9:
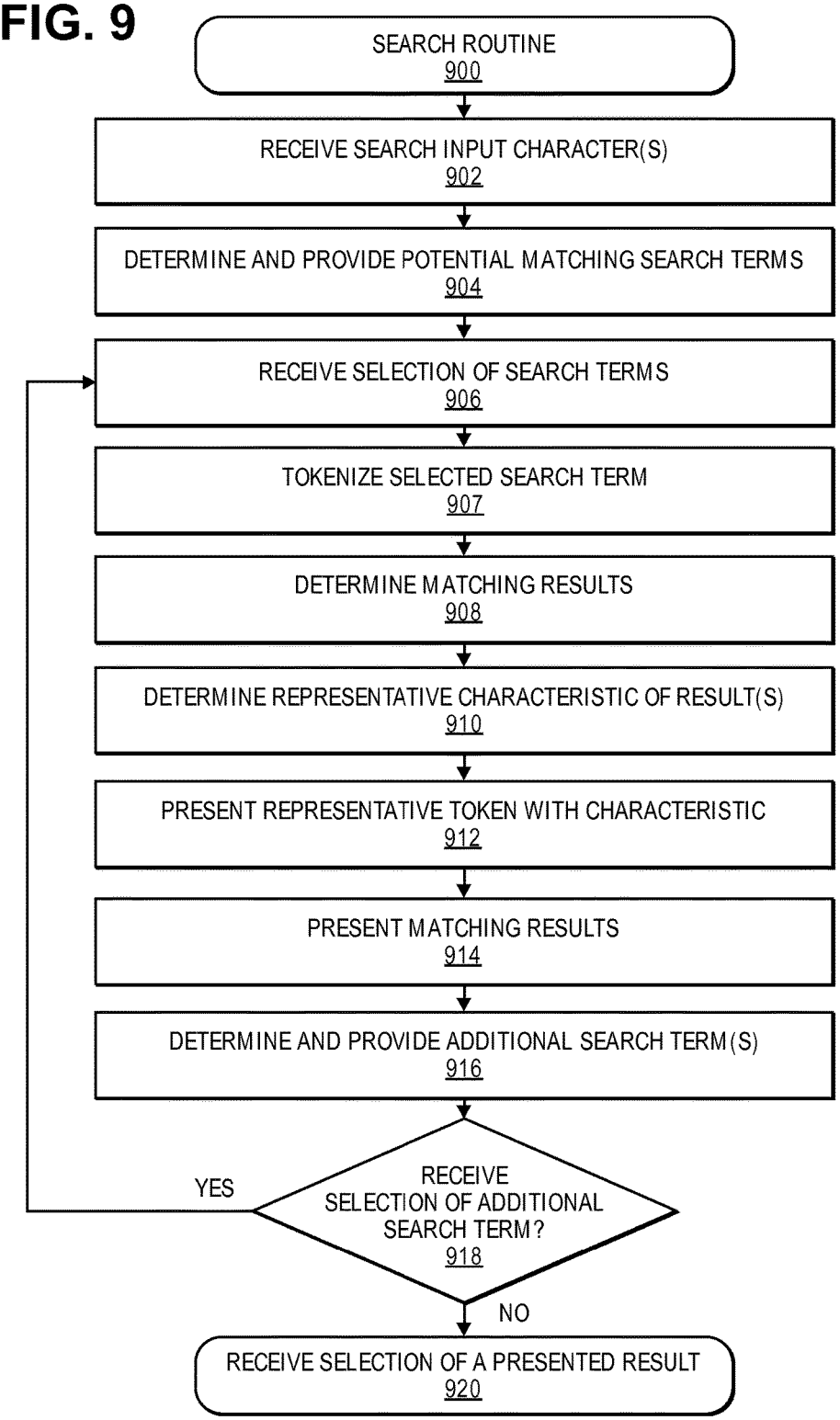
FIG. 9 is a flow diagram illustrating an example process for searching for information, according to an implementation.

FIG. 9 is a flow diagram illustrating an example process 900 for searching for information, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 900 begins by receiving a search input character(s), as in 902, in a search box for an initial search term. Upon receiving a search input, search terms that potentially match the intent of the user's input are determined and presented to the user. For example, if the user enters an "S," search terms that start with the letter "S" are determined and the most frequently used search terms that start with the letter "S" may be presented to the user, as in 904. In other implementations, other factors may be used to determine which search terms to present to the user that potentially match the characters input by the user.

After presenting the potentially matching search terms, the example process 900 receives an initial search term selection, as in 906. An initial search term may be selected by a user selecting a presented potential search term or by a user typing in a search term. The selected search term is tokenized, as in 907, and results matching the selected search term are determined, as in 908. Matching results may be any digital item that corresponds to or is otherwise related to the selected search term. For example, digital items may include metadata or tags describing the item. A digital item may be identified as matching a selected search term if one or more items of metadata or tags correspond to the search term.

A representative characteristic of one or more of the matching results is also determined, as in 910. For example, the most popular and/or top matching result may be identified and a characteristic (e.g., color) associated with the matching result may be identified. A visual token representative of the selected search term is then generated that includes the search term and the determined characteristic. The generated token is then sent for presentation to the user, as in 912. Likewise, matching results corresponding to the selected search term are also sent for presentation to the user, as in 914.

The example process may also determine one or more additional search terms that are sent for presentation to the user, as in 916. As discussed above, additional search terms may be descriptive and/or characteristic and used to further refine the matching results. A determination may then be made as to whether a selection of an additional search term is received, as in 918. An additional search term may be received by a user selecting one of the presented additional search terms and/or in response to a user typing in an additional search term. If it is determined that the user has selected an additional search term, the example process 900 returns to block 906 and continues. If the example process 900 returns to block 906 and continues, the matching results may be further refined to include only those that correspond to each selected search term. This process may repeat, with each selected search term, further refining the matching results until the user has selected a matching result. If it is determined that the user has not selected an additional search term, the selection of a matching result is received, as in 920.

Figure 10:
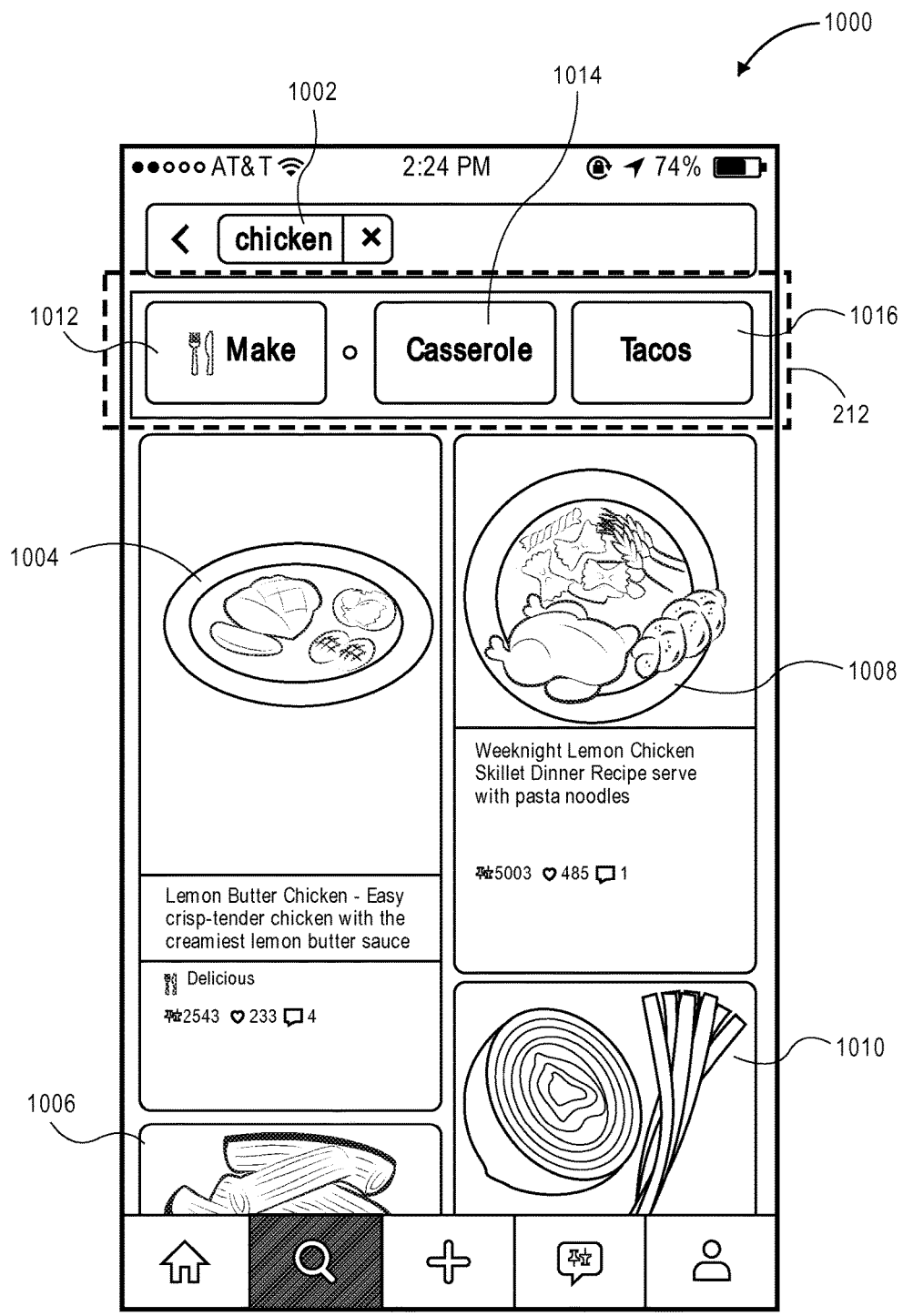
FIG. 10 is a representation of a graphical user interface illustrating results of a selected search term that includes an action token, in one implementation.

FIG. 10 is a representation of a graphical user interface 1000 illustrating results of a selected search term, in one implementation. In this example, the user has selected or provided the search term "chicken." As discussed above with respect to FIG. 2, upon selection of an initial search term (e.g., "chicken"), the search term is tokenized and visually presented as a token 1002 in the search box.

In addition to presenting the selected initial search term as a token 1002, results that match the search term are also visually presented to the user. Results matching the search term may be selected according to a variety of factors. For example, results may be selected based on the rating of the results by other users, based on the frequency of selection, based on an age of the result, based on a user's profile, location, time of day, items identified as of interest to the user, language, etc. In this example, the user is visually presented with four results 1004, 1006, 1008, 1010 that correspond to the selected initial search term "chicken." A user may scroll down and be presented with additional results that correspond with the search term "chicken."

In some implementations, a search refinement bar 212 may also be presented to the user. The search refinement bar 212 includes additional search terms or filters that may be added to the selected initial search term to further refine the set of matching results. Rather than requiring a user to manually enter additional search terms or select from a static list of filters, the additional search terms and filters presented in the search refinement bar 212 may be dynamically selected. In this example the search refinement bar includes an action filter "Make" 1012. The action filter corresponds to actions that are typically associated with the results provided for the currently selected search terms. Action filters may include, for example, Make, Do, Build, etc. A Make action filter, as discussed with respect to FIG. 10, may guide the user's search toward results that relate to the action make—in this example, making a recipe that includes the ingredient "chicken."

Other action filters may provide similar guidance. For example, a Build action filter may guide the user's search toward results that relate to building something.

Action filters may be provided in a manner similar to additional search terms. For example, action filters may be determined and presented based on one or more of user preferences and/or search history, user demographics, popularity of the results corresponding to the action filter when combined with the selected search term(s), location of the user, time of day, external event (e.g., news, advertisements), or other factors.

Similar to the other described examples, other search terms, such as Casserole 1014 and Tacos 1016, may also be presented in the search refinement bar 212 for selection by the user.

Figure 11:
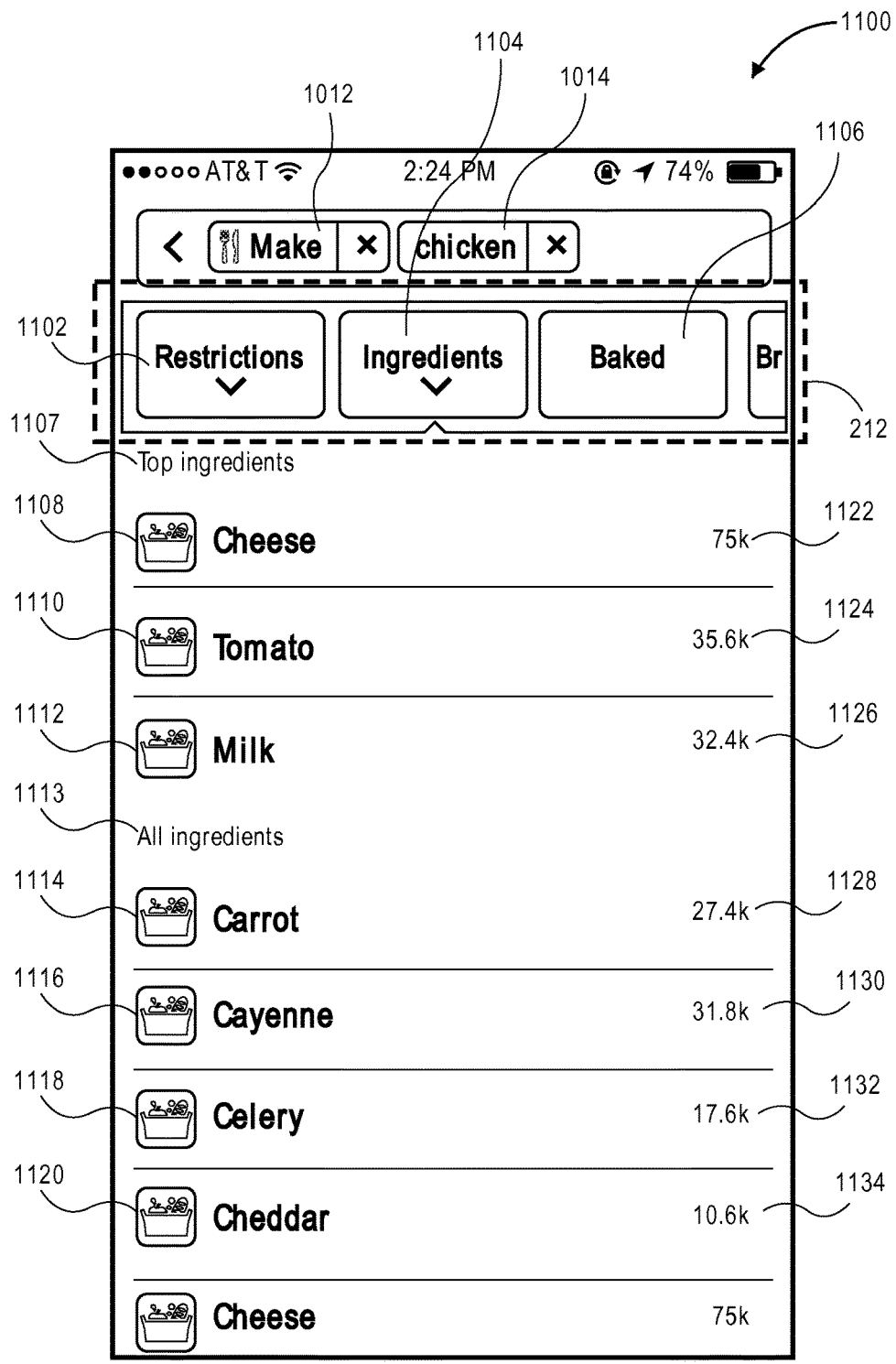
FIGS. 11-13 are representations of graphical user interfaces illustrating results of selecting an action token as part of the search, in one implementation.

FIG. 11 is a representation of a graphical user interface 1100 illustrating characteristic search terms that may be selected in response to a user selecting an action filter, in one implementation. FIG. 11 continues with the above example, and in this case the user has selected the action filter "Make" 1012 from the search refinement bar 212 of FIG. 10. Like the initial search term, the selected action filter "Make" is tokenized and presented as a token 1012 to the user. However, because the selected action filter is utilized to guide the search, the token 1012 is presented as the first token in the search bar and the search term "chicken" is the first search term corresponding to the action filter "Make."

Likewise, characteristic search terms corresponding to the action filter Make are presented in the search refinement bar 212. In this example, in response to the user selecting the action filter "Make," the search refinement bar includes the characteristic search terms of "Restrictions" 1102, "Ingredients" 1104 and "Baked" 1106. Upon selection of a characteristic search term from the search refinement bar 212, the user may be presented with one or more lists of characteristics that may be selected to further refine the matching results. For example, if the user selects the characteristic search term "Ingredients" 1104, the user may be presented with a list of Top ingredients 1107 that identifies the top ingredients in a recipe that includes the search term chicken 1014 and a list of All ingredients 1113 that include the search term chicken 1014.

In this example, the characteristics that are included in the list of Top ingredients 1107 include Cheese 1108, Tomato 1110, and Milk 1112. The list of all ingredients include the characteristics Carrot 1114, Cayenne 1116, Celery 1118, Cheddar 1120, etc. For each characteristic, the user interface 1100 may also identify the number of results that will be provided if the characteristic is selected and included with the other already selected search term(s) (in this example "chicken"). For example, the top ingredients characteristic of Cheese, when combined with the search term chicken, will result in seventy-five thousand matching recipes, as illustrated by the "75k" 1122. Likewise, Tomato combined with chicken will result in thirty-five thousand six hindered results, as illustrated by the "34.6k" 1124; Milk combined with chicken will return thirty-two thousand four hundred results, as illustrated by the "32.4k" 1126; Carrot combined with chicken will return twenty-seven thousand four hundred results, as illustrated by the "27.4k" 1128; Cayenne combined with chicken will return thirty-one thousand eight hundred results, as illustrated by the "31.8k" 1130; Celery combined with chicken will return seventeen thousand six hundred results, as illustrated by the "17.6k" 1132; and Cheddar combined with chicken will return ten thousand six hundred results, as illustrated by the "10.6k" 1134. The number of matching results may be an approximate representation or a rounded (e.g., to the nearest hundred) representation of the number of results that will be returned if the characteristic is selected and added to the other already selected search term(s).

The lists of characteristics may be provided in any order or fashion. For example, the Top ingredients list may be sorted based on the highest number of matching results. In comparison, the all ingredients list is sorted alphabetically. The lists of characteristics may be dynamically generated based on the already selected search term(s), user history, popularity of matching results, user preferences, etc. Likewise, in one implementation, the lists may only include characteristics that, when combined with the already selected search term(s), will return one or more results that correspond to the action filter, in this example "Make." The user may select one or more of the presented characteristics for use in further refining the matching results set.

Figure 12:
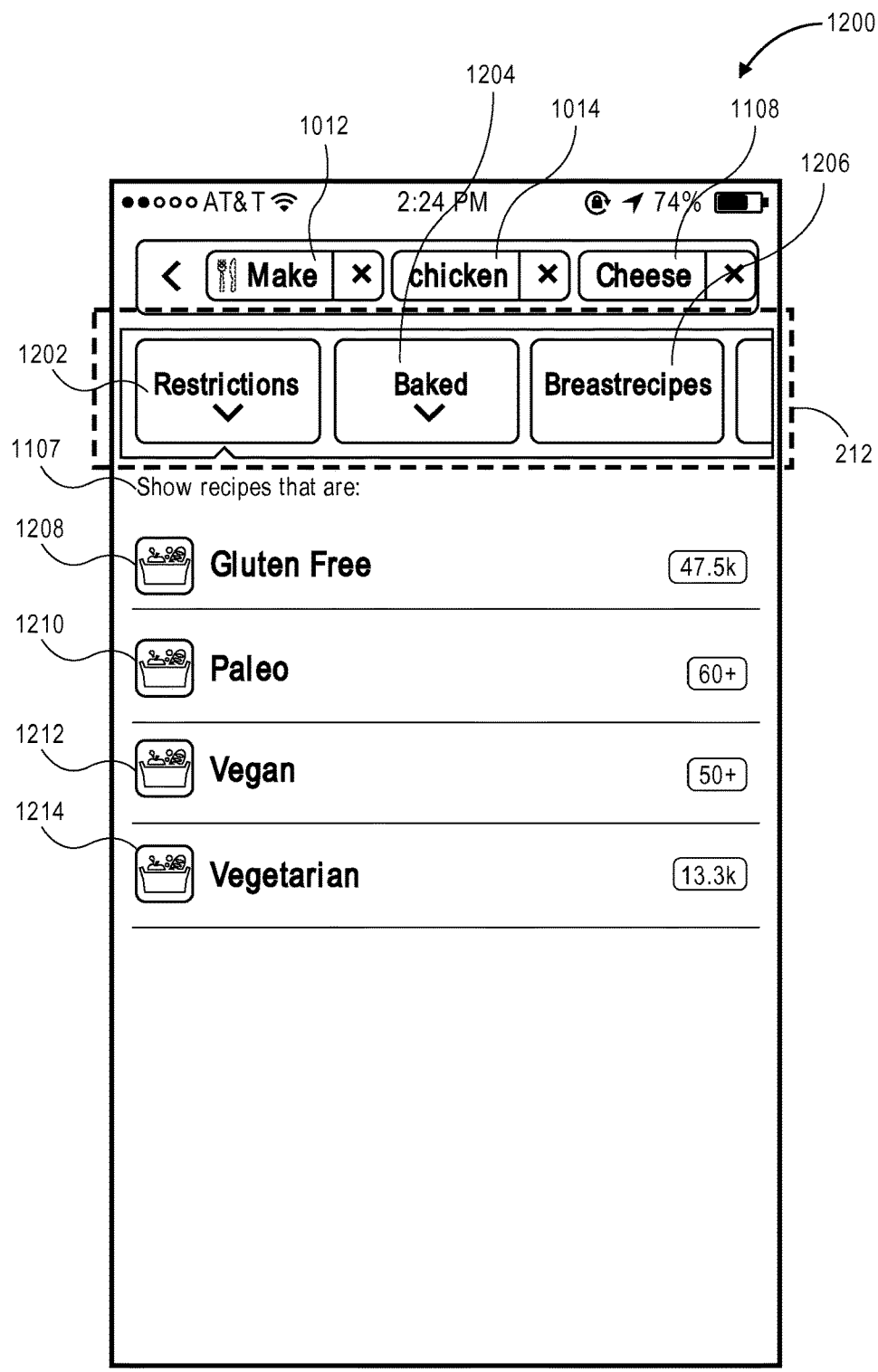

FIG. 12 is a representation of a graphical user interface 1200 illustrating additional characteristics that are presented, in one implementation. Continuing with the example illustrated in FIG. 11, the user has selected the characteristic Cheese which is tokenized and added as a token 1108 to the search bar along with the token 1012 for the action filter Make and the token 1014 for the initial search term chicken. Likewise, the search refinement bar 212 is updated to include additional characteristic search terms that may be selected to further refine the search. In this example, the search refinement bar 212 includes the characteristic search terms "Restrictions" 1202, "Baked" 1204, and "Breastrecipes" 1206. As described with respect to FIG. 11, a user may select one of the characteristic search terms and be presented with corresponding characteristics that may be selected and added to the other selected search terms to refine the search. Alternatively, if the user does not select another search term from the search refinement bar 212, the user may view and/or select a result (not shown) that matches the selected search term.

In this example, the user has selected the characteristic search term "Restrictions" and is presented with a list 1107 of characteristics. In this example, the restrictions include recipes that are "Gluten Free" 1208, "Paleo" 1210, "Vegan" 1212, and Vegetarian "1214." Similar to the other characteristics, the restrictions characteristics may be dynamically selected based on a variety of factors. Likewise, each characteristic may include a visual representation of a corresponding result that will be returned if the characteristic is selected and combined with the other already selected search term(s).

As with the other examples, a user may select a characteristic from the list and be presented with results corresponding to the selected term(s), filters and characteristics. Likewise, the user may continue to refine the search terms by adding, removing, reorganizing, replacing, etc., the search terms. By utilizing the action filters, the search may be guided toward results that correspond with the intent of the user's search—the action of the selected action filter.

Figure 13:
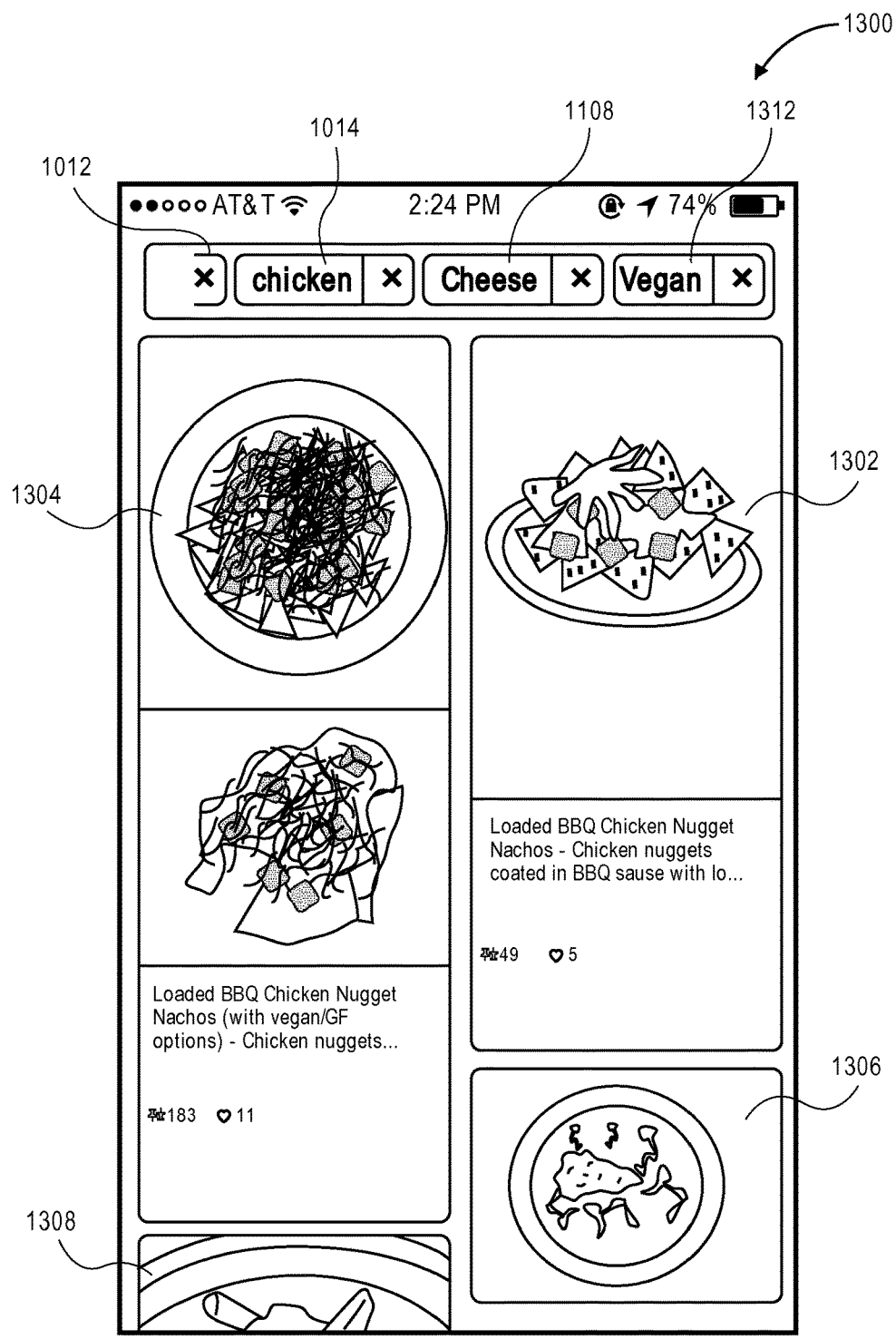

FIG. 13 is a representation of a graphical user interface 1300 illustrating the results from selecting the action Make, and the search terms chicken 1014, Cheese 1108, and Vegan 1212 (FIG. 12). As with the prior selections, the selected search term vegan 1212 is tokenized and added as a token 1312 to the search bar along with the token 1012 for the action filter Make, the token 1014 for the search term chicken, and the token 1108 for the search term Cheese. The results corresponding to the selected action filter and search terms are presented on the user interface. In this example, graphical representations for 1302, 1304, 1306, and 1308 are presented for recipes that match the selected search terms and action filter. In this example, the graphical representations represent the food dishes for each of the recipes that matches the selected search term.

A user may select or otherwise interact with the representations 1302-1308 matching the search terms and action filter. For example, a user may select the representation 1304 and be presented with a recipe for making vegan, chicken, nachos. As with the discussion above, a user may also reorder, remove and/or replace a token 1012, 1108, 1312, etc. For example, if the user selected the token 1312 for the search term "Vegan," the user may be presented with alternative search terms that may be selected to replace the search term Vegan that will still return matching results when combined with the other selected search terms and action filter. For example, the user may be presented with the alternative search terms "Gluten Free," "Paleo," and "Vegetarian," each of which will return one or more matching results.

Figure 14:
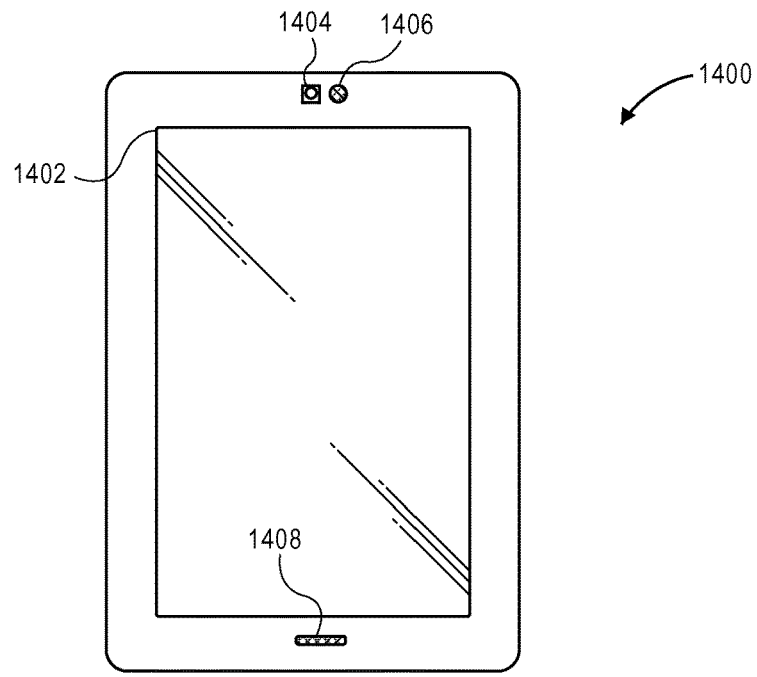
FIG. 14 illustrates an example computing device that can be used in accordance with various implementations.

FIG. 14 illustrates an example client device 1400 that can be used in accordance with various implementations described herein. In this example, the client device 1400 includes a display 1402 and optionally at least one input component 1404, such as a camera, on a same side of the device as the display 1402. The client device 1400 may also include an audio transducer, such as a speaker 1406, and optionally a microphone 1408. Generally, the client device 1400 may have any form of input/output components that allow a user to interact with the client device 1400. For example, the various input components for enabling user interaction with the device may include a touch-based display 1402 (e.g., resistive, capacitive, Interpolating Force-Sensitive Resistance (IFSR)), camera (for gesture tracking, etc.), microphone, global positioning system (GPS), compass or any combination thereof. One or more of these input components may be included on a device or otherwise in communication with the device. Various other input components and combinations of input components can be used as well within the scope of the various implementations as should be apparent in light of the teachings and suggestions contained herein.

Figure 15:
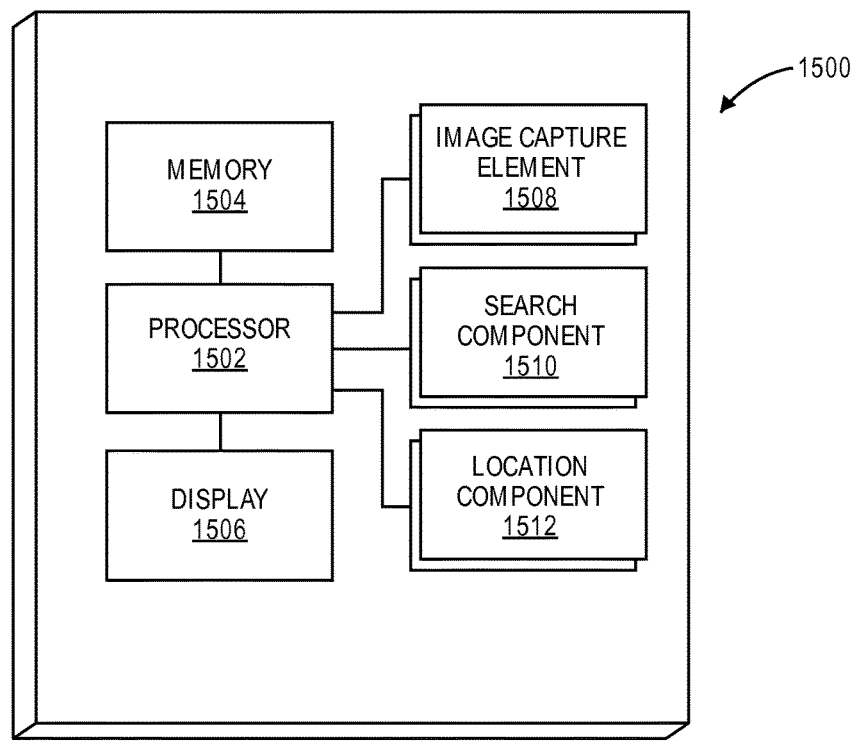
FIG. 15 illustrates an example configuration of components of a computing device, such as that illustrated in FIG. 14.

In order to provide the various functionality described herein, FIG. 15 illustrates an example set of basic components 1500 of a client device 1400, such as the client device 1400 described with respect to FIG. 14 and discussed herein. In this example, the device includes at least one central processor 1502 for executing instructions that can be stored in at least one memory device or element 1504. As would be apparent to one of ordinary skill in the art, the device can include many types of memory, data storage or computer-readable storage media, such as a first data storage for program instruction for execution by the processor 1502. Removable storage memory can be available for sharing information with other devices, etc. The device typically will include some type of display 1506, such as a touch-based display, electronic ink (e-ink), organic light emitting diode (OLED) or liquid crystal display (LCD).

As discussed, the device in many implementations will include at least one image capture element 1508, such as one or more cameras that are able to image objects in the vicinity of the device. An image capture element can include or be based at least in part upon any appropriate technology, such as a CCD or CMOS image capture element having a determined resolution, focal range, viewable area, and capture rate. The device can include at least one search component 1510 for performing the process of generating search terms, tokens and/or identifying and presenting results matching a selected search term. For example, the client device may be in constant or intermittent communication with a remote computing resource (not shown) and may exchange information, such as selected search terms, digital items, tokens, etc., with the remote computing system as part of the search process.

The device also can include at least one location component 1512, such as GPS, NFC location tracking or Wi-Fi location monitoring. Location information obtained by the location component 1512 may be used with the various implementations discussed herein as a factor in selecting additional search terms to present to the user and/or as a factor in determining which results matching selected search terms to present to the user.

The example client device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through touch (e.g., touch-based display), audio (e.g., spoken) commands, or a combination thereof.

Figure 16:
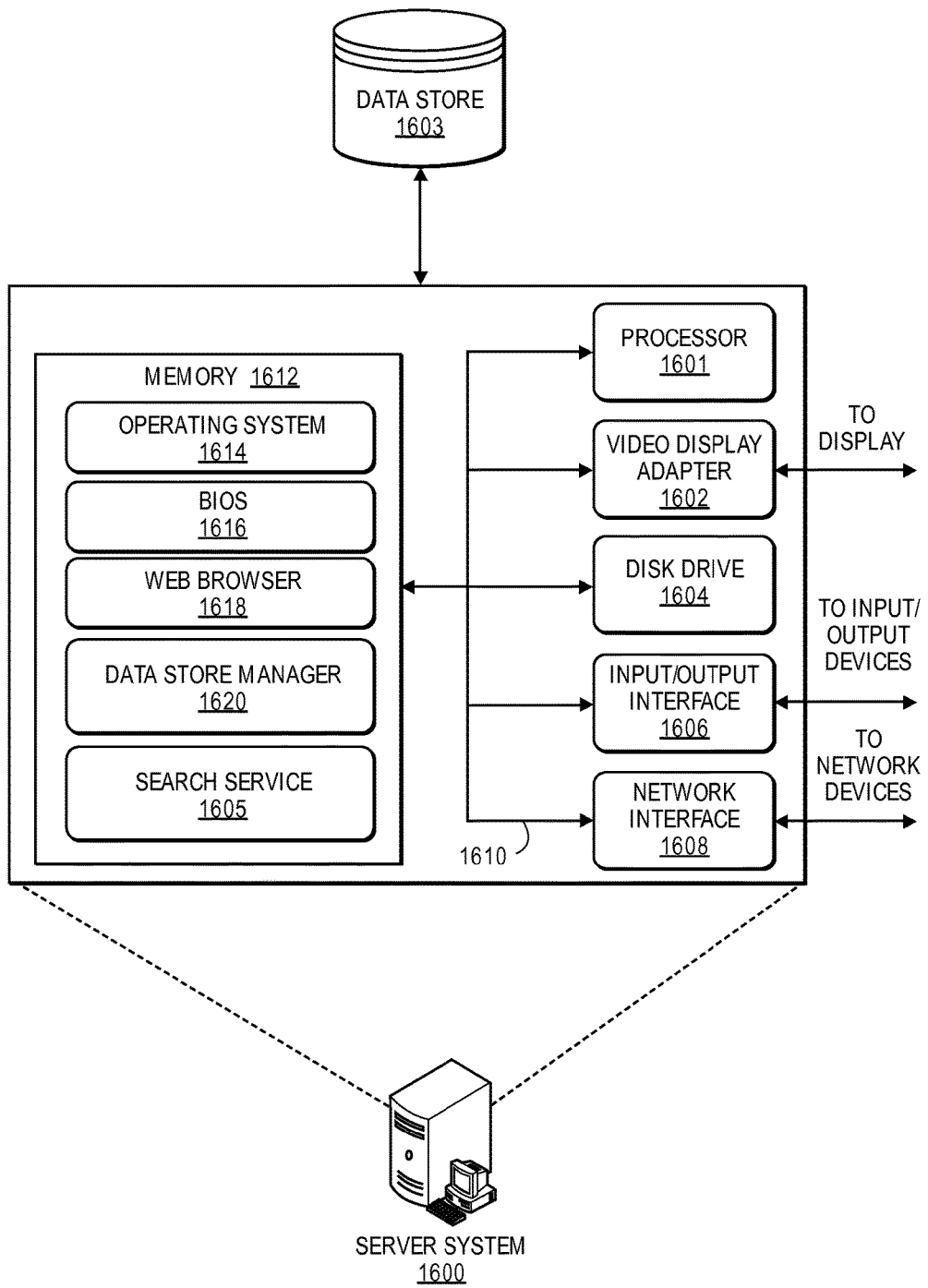
FIG. 16 is a pictorial diagram of an illustrative implementation of a server system that may be used for various implementations.

FIG. 16 is a pictorial diagram of an illustrative implementation of a server system 1600, such as a remote computing resource, that may be used with one or more of the implementations described herein. The server system 1600 may include a processor 1601, such as one or more redundant processors, a video display adapter 1602, a disk drive 1604, an input/output interface 1606, a network interface 1608, and a memory 1612. The processor 1601, the video display adapter 1602, the disk drive 1604, the input/output interface 1606, the network interface 1608, and the memory 1612 may be communicatively coupled to each other by a communication bus 1610.

The video display adapter 1602 provides display signals to a local display (not shown in FIG. 16) permitting an operator of the server system 1600 to monitor and configure operation of the server system 1600. The input/output interface 1606 likewise communicates with external input/output devices not shown in FIG. 16, such as a mouse, keyboard, scanner, or other input and output devices that can be operated by an operator of the server system 1600. The network interface 1608 includes hardware, software, or any combination thereof, to communicate with other computing devices. For example, the network interface 1608 may be configured to provide communications between the server system 1600 and other computing devices, such as the client device 1400, via the network 1500, as shown in FIG. 15.

The memory 1612 generally comprises random access memory (RAM), read-only memory (ROM), flash memory, and/or other volatile or permanent memory. The memory 1612 is shown storing an operating system 1614 for controlling the operation of the server system 1600. A binary input/output system (BIOS) 1616 for controlling the low-level operation of the server system 1600 is also stored in the memory 1612.

The memory 1612 additionally stores program code and data for providing network services that allow client devices 1400 and external sources to exchange information and data files with the server system 1600. Accordingly, the memory 1612 may store a browser application 1618. The browser application 1618 comprises computer executable instructions, that, when executed by the processor 1601 generate or otherwise obtain configurable markup documents such as Web pages. The browser application 1618 communicates with a data store manager application 1620 to facilitate data exchange and mapping between the data store 1603, client devices, such as the client device 1400, external sources, etc.

As used herein, the term "data store" refers to any device or combination of devices capable of storing, accessing and retrieving data, which may include any combination and number of data servers, databases, data storage devices and data storage media, in any standard, distributed or clustered environment. The server system 1600 can include any appropriate hardware and software for integrating with the data store 1603 as needed to execute aspects of one or more applications for the client device 1400, the external sources and/or the Search service 1605. The server system 1600 provides access control services in cooperation with the data store 1603 and is able to generate content such as matching search results, additional search terms, digital items, text, graphics, audio, video and/or object identifier or set related information (e.g., representations, context, descriptions, mappings) to be transferred to the client device 1400.

The data store 1603 can include several separate data tables, databases or other data storage mechanisms and media for storing data relating to a particular aspect. For example, the data store 1603 illustrated includes digital items and corresponding metadata about those items. Search history, user preferences, profiles and other information may likewise be stored in the data store.

It should be understood that there can be many other aspects that may be stored in the data store 1603, which can be stored in any of the above listed mechanisms as appropriate or in additional mechanisms of any of the data store. The data store 1603 may be operable, through logic associated therewith, to receive instructions from the server system 1600 and obtain, update or otherwise process data in response thereto.

The memory 1612 may also include the search service 1605. The search service 1605 may be executable by the processor 1601 to implement one or more of the functions of the server system 1600. In one implementation, the search service 1605 may represent instructions embodied in one or more software programs stored in the memory 1612. In another implementation, the search service 1605 can represent hardware, software instructions, or a combination thereof.

The server system 1600, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction in FIG. 16 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A non-transitory computer-readable medium having computer-executable instructions stored thereon, wherein the instructions, when executed, cause a computer system having at least one computer processor to perform a method comprising:
   receiving at the computer system a selection of a search term;
   determining a plurality of matching results corresponding to the search term;
   presenting on a display of the computer system a token;
   presenting on the display of the computer system a plurality of digital items representing at least some of the matching results corresponding to the search term, wherein the digital items correspond to a subset of the plurality of matching results including the first matching result; and
   presenting on the display of the computer system and without user interaction, additional search terms for selection by a user, the additional search terms comprising at least a first token representative of a first additional search term and a second token representative of a second additional search term, wherein the first token and the second token are not the same token.

2. The non-transitory computer-readable medium of claim 1, wherein the visual characteristic is a color corresponding to the digital item.

3. The non-transitory computer-readable medium of claim 1, wherein the digital item is a top ranking item corresponding to the search term.

4. The non-transitory computer-readable medium of claim 1, wherein the additional search terms correspond to characteristics of a plurality of digital items corresponding to the search term of the matching results.

5. The non-transitory computer-readable medium of claim 1, the method further comprising:
   determining a plurality of alternative search terms, wherein the plurality of alternative search terms is dynamically determined based at least in part on a quantity of results of an alternative search term and the search term.

6. A computing system, comprising:
   one or more processors; and
   a memory coupled to the one or more processors and storing program instructions that when executed by the one or more processors causes the one or more processors to at least:
      receive a selection of a first search term;
      determine a plurality of matching results corresponding to the first search term;
      present a token visually representative of the first search term;
      present a plurality of visual representations of a subset of the plurality of matching results, including the first matching result;
      determine, based at least in part on the first search term and without additional user interaction, a plurality of additional search terms to refine the plurality of matching results;
      present a first token representative of a first additional search term of the plurality of additional search terms;
      present a second token representative of a second additional search term of the plurality of additional search terms; and
      present a third token representative of a third additional search term of the plurality of additional search terms;
      wherein the first token, the second token and the third token are distinct tokens.

7. The computing system of claim 6, wherein the program instructions that when executed by the one or more processors further cause the one or more processors to at least:
   receive an input;
   determine, based at least in part on the input, a plurality of potential search terms corresponding to the input;
   present the plurality of potential search terms; and
   wherein the search term is selected from the plurality of potential search terms.

8. The computing system of claim 7, wherein the program instructions that when executed by the one or more processors further cause the one or more processors to at least:
   present, adjacent to each of the plurality of potential search terms, a visual representation of a search result corresponding to a respective potential search term.

9. The computing system of claim 6, wherein the plurality of additional search terms are determined based at least in part on one or more of a user preference, a search history, a demographic, a popularity of matching results corresponding to an additional search term when combined with the search term, a location of a user, a time of day, or an external event.

10. The computing system of claim 6, wherein:
    the first search term corresponds to a first category;
    the second search term corresponds to the first category;
    the third search term corresponds to a second category; and
    wherein the program instructions that when executed by the one or more processors further cause the one or more processors to at least arrange the presentation of the first token, the second token and the third token such that the first token is not presented adjacent to the second token.

11. The computing system of claim 6, wherein:
    the first additional search term is a characteristic representative of at least one of the plurality of matching results; and
    the second additional search term is a descriptive term representative of at least one of the plurality of matching results.

12. The computing system of claim 11, wherein the program instructions that when executed by the one or more processors further cause the one or more processors to at least:
    receive a selection of the first additional search term;
    present a plurality of characteristic options corresponding to the first additional search term, wherein the plurality of characteristic options is dynamically determined based at least in part on a quantity of results of a characteristic option;
    receive a selection of a characteristic option;

determine a second plurality of matching results based at least in part on the search term and the characteristic option; and present a plurality of visual representations of a subset of the second plurality of matching results.

13. A computer-implemented method, comprising:

under control of one or more computing systems configured with executable instructions, receiving at a device a selection of a first search term;

determining a plurality of alternative search terms for refining matching results of the first search term without additional user interaction, wherein the plurality of alternative search terms is dynamically determined based at least in part on a quantity of results of an alternative search term and the first search term;

determining a first plurality of matching results corresponding to the first search term;

presenting on a display of the device a first token representative of the first search term;

presenting on the display digital items corresponding to visual representations of the first plurality of matching results;

receiving at the device a selection of the first token;

presenting on the display the plurality of alternative search terms comprising at least a first token representative of a first additional search term and a second token representative of a second additional search term, wherein the first additional search term and the second additional search term are not the same;

receiving at the device a selection of an alternative search term of the plurality of alternative search terms;

removing from the display the presentation of the first token;

presenting on the display a second token representative of the alternative search term;

determining a second plurality of matching results corresponding to the alternative search term; and presenting on the display visual representations of the second plurality of matching results.

14. The computer-implemented method of claim 13, wherein the plurality of alternative search terms is ordered for presentation on the display based at least in part on one or more of a popularity of the alternative search term, a quantity of results of the alternative search term, a user preference, a user history, or a user profile.

15. The computer-implemented method of claim 13, further comprising:

determining, based at least in part on the second plurality of matching results, a plurality of additional search terms that may be used to refine the second plurality of matching results;

presenting on the display, a first additional search term of the plurality of additional search terms;

receiving at the device, a selection of the first additional search term;

presenting on the display, a third token representative of the first additional search term;

determining a third plurality of matching results corresponding to the alternative search term and the first additional search term; and presenting on the display, the third plurality of matching results.

16. The computer-implemented method of claim 15, wherein the third plurality of matching results is determined based at least in part on an order of the alternative search term and the first additional search term.

17. The computer-implemented method of claim 15, further comprising:

determining a second plurality of alternative search terms corresponding to the first additional search term, wherein the second plurality of alternative search terms include only alternative search terms that would result in at least one matching result based on a combination of the alternative search term and a second alternative search term of the second plurality of alternative search terms.

18. The computer-implemented method of claim 15, further comprising:

receiving at the device, a selection to remove the alternative search term;

removing from the display, the second token;

determining a fourth plurality of matching results that correspond to the first additional search term; and presenting on the display the fourth plurality of matching results.

19. The computer-implemented method of claim 15, further comprising:

receiving at the device, a selection of the third token;

determining that an order of the second token and the third token is to be changed;

presenting on the display, the second token and the third token corresponding to a changed order;

determining a fourth plurality of matching results that correspond to the first additional search term and further correspond to the alternative search term; and presenting on the display, the fourth plurality of matching results.

* * * * *